No. 656,287. Patented Aug. 21, 1900.
L. GROTE.
ART OF MAKING GLASS BOTTLES.
(Application filed June 16, 1900.)
(No Model.)
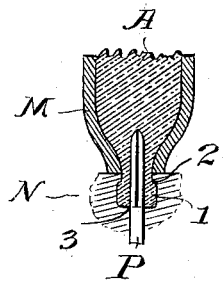
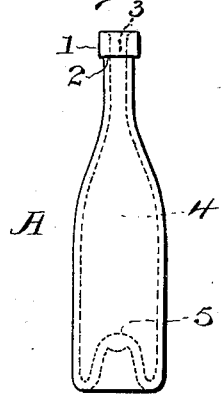
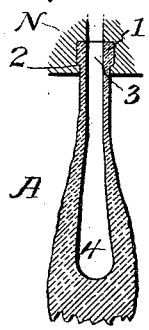
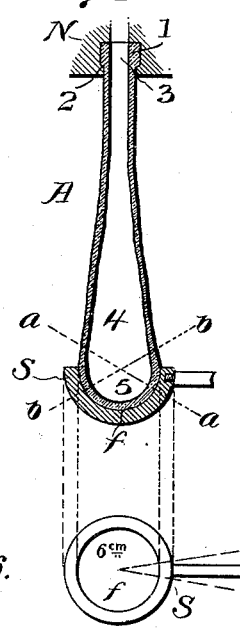
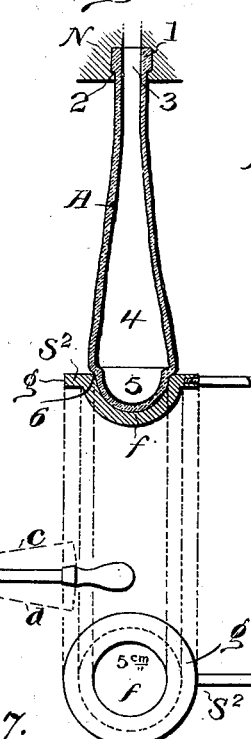
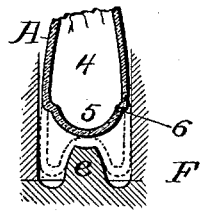
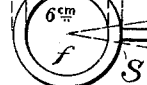
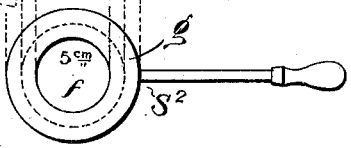
Witnesses:
Fenton S. Belt,
Inventor:
Ludwig Grote,
by Francis Forbes
Attorney.
THE NORRIS PETERS CO., PHOTO-LITHO., WASHINGTON, D. C.

UNITED STATES PATENT OFFICE.

LUDWIG GROTE, OF LONDON, ENGLAND, ASSIGNOR TO THE GROTE BOTTLE MACHINE COMPANY, OF JERSEY CITY, NEW JERSEY.

ART OF MAKING GLASS BOTTLES.

SPECIFICATION forming part of Letters Patent No. 656,287, dated August 21, 1900.

Application filed June 16, 1900. Serial No. 20,591. (No model.)

*To all whom it may concern:*

Be it known that I, LUDWIG GROTE, a subject of the Emperor of Germany, residing at 84<sup>B</sup> East India Dock road, Poplar, London, England, have invented a new and useful Improvement in the Art of Making Glass Bottles, of which the following is a specification.

This invention relates to the manufacture of glass bottles as practiced in part by means of machinery.

The present invention consists in a novel process whereby ordinary operatives are enabled to practically and economically produce in that way that style of bottle which has a deep dome-shaped bottom, the dome or "kick-up" of which is surrounded by the annular base portion on which the bottle stands. This base edge or rim of the bottle is subjected not only to the pressure of the contents and the ordinary strains due to molding and handling, but to the greatest strains within the mold and when the latter is opened and to the impact of the table or other support when the bottle is set down. It is consequently essential that there shall be in said base portion of the bottle a uniform and sufficient thickness of glass in good condition. I accomplish this object and at the same time provide the bottle with a symmetrical kick-up of any required depth in the manner and by the means illustrated by the accompanying sheet of drawings, in which—

Figure 1 represents an axial section through a measured parison of molten glass and through a parison-mold, "neck-mold," and plunger used in producing the same. Fig. 2 represents a like section through the reversed parison and through the inner portion of the neck-mold in which its lip portion or head is held. Fig. 3 represents a like section through the same parts and through a "spoon" used for manipulating the glass while so suspended. Fig. 4 represents a like section through said parison and neck molds and through a second spoon by which the process is continued. Fig. 5 represents a section through the lower portion of the partly-formed bottle at a later stage and through the lower portion of a finishing-mold. Figs. 6 and 7 represent top views of the respective spoons, and Fig. 8 is a side elevation of the final product.

Like letters and numbers refer to like parts in all the figures.

In carrying my said process into effect I proceed as follows: The glass A for a bottle is measured within a bisected parison-mold M, Fig. 1, and a bisected head-mold or neck-mold N, the latter, in connection with an axial plunger P, serving to form the lip 1 and the neck 2, immediately adjacent thereto, by casting and punching upward into the molten glass in a known way. The mouth-forming portion or point of the plunger P is preferably square or of an equivalent "flattened" shape in cross-section and is projected into the glass only an instant and at the same time rotated back and forth, so as to form a perfectly rounded and smooth mouth or neck bore 3, into which air is at once gently forced. For the purpose of the present invention all such mechanical devices, except as herein specifically provided, may be of any known or improved description that is or may be successfully operative. While the plunger P is being retracted or immediately thereafter, the glass A, together with the parison-mold M, neck-mold N, and plunger P, is reversed and the parison-mold is removed therefrom, so as to leave the hollow parison hanging from the neck mold, as in Fig. 2, and exposed for manipulation. Meanwhile the gentle introduction of the air is continued and the body-cavity 4 is developed, the glass A lengthening at the same time by its own weight. The bowl of a spoon S, Fig. 6, in the form of one-half of a hollow sphere, is now applied to the lower extremity of the glass A. Said spoon S is gyrated, as illustrated by the dotted lines *a*, *b*, *c*, and *d*, Figs. 3 and 6, or otherwise manipulated, as the skill of the operator may suggest, to render homogeneous the bottom-glass 5, and this working of the glass A, together with the gentle pressure of air within it, is continued until the bottom-glass 5 nearly approaches the depth within the finishing-mold F, Fig. 5, above its bottom projection *e*. Then, as in Fig. 4, a second spoon S², Fig. 7, is substituted, having a concavity *f* of somewhat smaller dimensions than that of the spoon S, surrounded by a flat rim *g*, and this second spoon is worked like an ordinary paddle until a circumferential shoulder 6, Figs. 4 and 5, circumscribes a depending central portion of the bottom-glass 5. The second spoon S² is then laid aside, the finishing-mold F is closed around the glass A, and the full pressure of air for blowing the bottle is turned on. Coming into contact with said bottom projection e within the finishing-mold, the bottom-glass 5 within the shoulder 6 being still red-hot at least, is quickly reversed or turned like a glove-finger, as illustrated by full and dotted lines at 5 in Fig. 5, and in another instant the glass A is blown into contact with the interior of the finishing-mold, throughout the latter. The thoroughly-homogeneous bottom-glass, retaining ample heat for the purpose, distributes itself equally over the bottom projection e and within the base-crease surrounding the same in the finishing-mold F, so as to be practically of uniform thickness throughout.

In the final product, Fig. 8, the bottom-glass 5 forms a deep dome-shaped bottom of any required depth and a rounded hollow base edge or rim of equal or superior strength and uniformity as compared with those of bottles heretofore produced wholly by hand.

The product may be of any desired shape and proportions and either "turned" or "unturned," and if unturned it may be either plain or provided in the finishing-mold with lettering or the like, and other like modifications will suggest themselves to those skilled in the art.

One and the same pair of spoons of the construction above set forth will serve for different sizes of bottles of diameters not considerably exceeding the outer diameter of the rim $g$ nor less than that of the concavity $f$ of the first spoon.

Having thus described said improvement, I claim as my invention and desire to patent under this specification—

1. The within-described process of making a glass bottle with a deep dome-shaped bottom, such process consisting in measuring the glass, casting the head of the bottle and forming the mouth and initial cavity within the glass; then suspending the glass by means of its head, gently admitting air under pressure into said cavity, and exposing the glass for manipulation; then working the lower extremity of the glass to render the bottom-glass homogeneous and substantially hemispherical; then paddling the same to form a shoulder circumscribing a depending central portion of the bottom-glass, reversing or turning the circumscribed bottom-glass during the blowing operation and finally completing the blowing of the bottle, whereby a dome or kick-up of any required depth is formed and the glass evenly distributed throughout the bottom and base edge or rim of the bottle.

2. In the art of making glass bottles, the process of working the lower extremity of the molten glass in a pendent position to render the bottom-glass homogeneous and circumscribing a depending central portion of said bottom-glass with a shoulder by paddling, reversing or turning the circumscribed bottom-glass during the blowing operation, and finally completing the blowing of the bottle, substantially as hereinbefore specified.

LUDWIG GROTE.

Witnesses:
WILLIAM J. HARVEY,
ANDREW FOULDS, Jr.